United States Patent [19]
Cornforth et al.

[11] 3,968,681
[45] July 13, 1976

[54] TESTING ARTICLES

[75] Inventors: Alexander Rankin Cornforth, Stanion; Peter John Trigg, Corby, both of England

[73] Assignee: The British Steel Corporation, London, England

[22] Filed: June 12, 1974

[21] Appl. No.: 478,488

[30] Foreign Application Priority Data
June 19, 1973 United Kingdom............... 29000/73

[52] U.S. Cl............................. 73/67.5 R; 73/67.9; 324/34 TK
[51] Int. Cl.².......................................... G01N 29/00
[58] Field of Search............... 73/67.2, 67.7, 67.8 R, 73/67.5 R, 67.8 S, 67.9, 71.5 US; 324/34 TK; 235/151.13, 151.3

[56] References Cited
UNITED STATES PATENTS

| 2,836,059 | 5/1958 | Beaujard et al. | 73/67.8 S |
| 3,248,933 | 5/1966 | Stebbins | 73/67.8 S |
| 3,276,249 | 10/1966 | King | 73/67.8 |
| 3,354,700 | 11/1967 | Schindler | 73/67.9 |
| 3,570,279 | 3/1971 | Davies | 73/67.9 |
| 3,712,119 | 1/1973 | Cross et al. | 73/67.7 |
| 3,808,879 | 5/1974 | Rogers | 73/67.9 |

Primary Examiner—Richard C. Queisser
Assistant Examiner—Stephen A. Kreitman
Attorney, Agent, or Firm—Nolte and Nolte

[57] ABSTRACT

The testing of an article for deviations thereof from an optimum thickness range includes scanning the article by means of a thickness measuring device; making a plurality of thickness measurements of the article during each scan; averaging successive groups of a predetermined number of theoretical measurements during each scan; comparing the averages so obtained with predetermined desired averages and marking a visual record with symbols indicative of whether each group is within, greater than, or less than the desired average.

16 Claims, 4 Drawing Figures

TESTING ARTICLES

This invention relates to the testing of articles, and more particularly to apparatus for and a method of nondestructivity testing the thickness of an article and providing a pictorial record of deviations of thickness of the article from an optimum thickness or an optimum thickness range.

It is known to test articles, particularly articles such as steel strip or tubes having a substantially constant theoretical thickness for deviations of thickness outside specified tolerance values by scanning the articles by means of a thickness measuring device, such as an ultrasonic or electromagnetic device, and carrying out a plurality of thickness measurements during each such scan.

It is an object of the present invention to provide such a testing arrangement with which there can be provided an easily readable pictorial record of thickness deviations.

According to one aspect of the present invention there is provided a method of testing an article for deviations of thickness thereof from an optimum thickness or thickness range including scanning the article by means of a thickness measuring device, making a plurality of thickness measurements of the article during each scan, averaging successive groups of a predetermined theoretical number of measurements across each scan, comparing the averages so obtained with predetermined desired averages and marking a visual record with symbols indicative of whether each group is within, greater than or less than the desired average.

According to another aspect of the present invention there is provided apparatus for testing an article for deviations thereof from an optimum thickness or thickness range including a thickness measuring device mounted for scanning movement across the article, means for making a plurality of thickness measurements of the article during each scanning movement of the thickness measuring device, electrical means for averaging the thickness measurements of successive groups of a predetermined theoretical number of measurements during each scan and comparing the average measurements so obtained with a desired average, and visual recording means for recording each group comparison with symbols indicative of whether the average is within, greater than or less than the desired average.

Conveniently the visual record is in the form of a paper sheet on which the symbols are set out in matrix form, i.e. the symbols representative of the averages for each group in one scan are set out side by side in a rank across the sheet, and each scan is provided with a separate rank along the sheet.

The marking for the sheet may be carried out by a known form of recording device, such as a multi-pen electrostatic recorder. The symbols may be built up by a plurality of scans of the recorder across the sheet, so that the recorder scans the sheet a plurality of times for each scan of the measuring device across the article.

Conveniently the measuring device is an ultrasonic testing device adapted to transmit a plurality of ultrasonic pulses into the article during each scan and receive a plurality of echoes thereof after time intervals indicative of the thickness of the article.

Where tubes are being tested for deviations of wall thickness the measuring device may be mounted for rotary motion about the tube. In this case one complete revolution may be taken as one scan.

In order that the invention may be more readily understood, one embodiment thereof will now be described by way of example with reference to the accompanying drawings in which FIG. 1 is a diagrammatic representation of a scanning arrangement for a steel tube;

Figure 1:
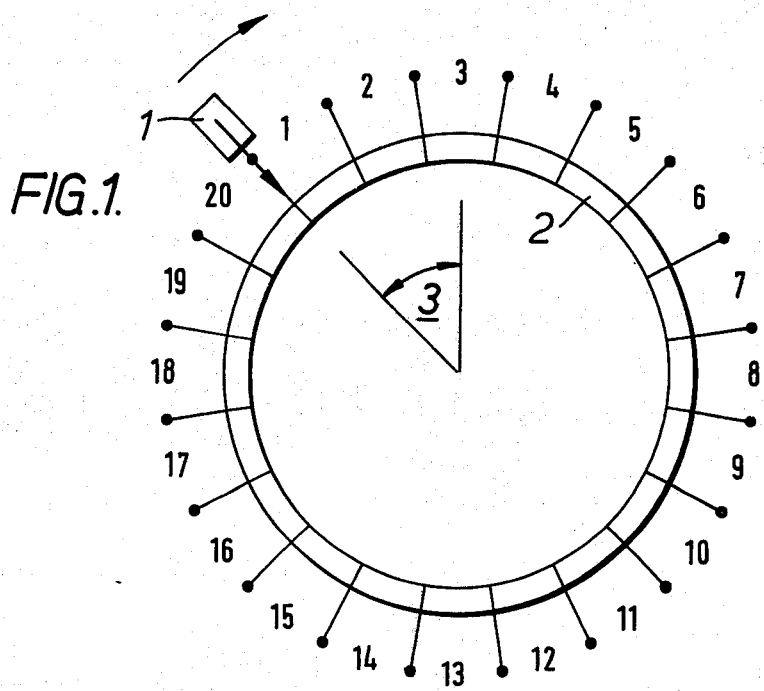
Figure 4:
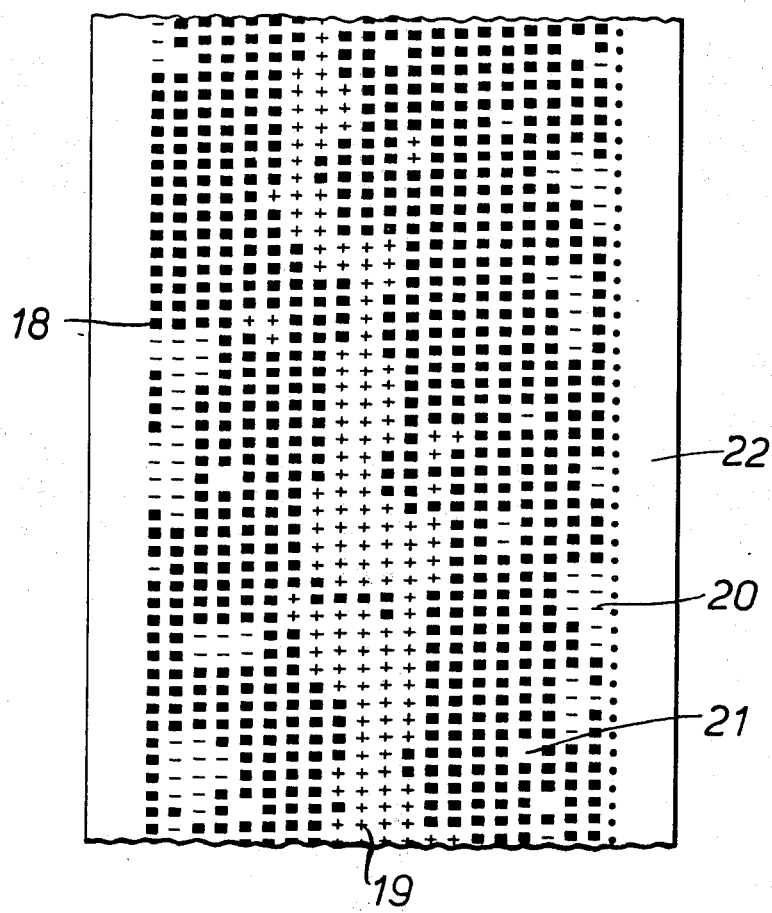
FIG. 4 shows a sample readout sheet of the average thickness record.

The arrangement illustrated averages, on a matrix basis, the thickness measurements obtained from probe 1 (which will usually be one of a number of such probes; e.g. four, mounted on a probe rotor) rotating around a tube 2. The matrix is pictorally represented on an electrostatic recording paper sheet by a series of symbols each of which denotes whether the average of a group of thickness measurements, taken over a predetermined segment of the tube circumference, is within the thickness tolerance for the tube, below the thickness tolerance, or above the thickness tolerance. The extent of the circumferential segment is selectable but is typically 5% as shown in FIG. 1. Thus 20 matrix points represent the tube circumference. At typical throughput speeds, the helical pitch of one probe is 2 inches. This then fixes the array to 5% × 2 inches blocks of information. Thus for a 40 ft. long tube a 20 × 240 array results on the output record sheet (FIG. 4).

The ultrasonic probe 1 which is used for averaging thickness measurements is pulsed at a pulse repetition frequency of 1 KHz, i.e. thickness information is returning from the probe at 1 m/sec intervals. The rotary probe speed thus governs the number of measurements taken per circumferential scan of the tube surface. In the case of the typical arrangement illustrated, the rotary probe speed is 100 r.p.m. and thus 600 thickness measurements are attempted per circumferential scan. Hence the number of measurements attempted during a 5% scan is 30. The system is thus required to average these 30 attempts in each segment successively around the tube circumference, on each circumferential scan along the tube length.

The testing apparatus to which the particular embodiment of the invention is applied is provided with 200 steel studs (not shown) equidistantly located around the probe rotor (not shown) upon which the probe 1 is mounted, and are detected by a magnetic sensor when the probe rotor is rotating. Thus for every revolution of the rotary head, 200 pulses are produced. A single stud and associated magnetic sensor (not shown) are also provided to produce one pulse per revolution of the head. This single stud is located such that it is coincident with its associated sensor when probe 1 is at 45° before top dead centre, as shown at 3 in FIG. 1.

The signals produced therefore are primarily: the thickness measurement signals from probe 1, the 200 pulses per revolution information, the 1 pulse per revolution information and, additionally, a master timing waveform which allows thickness measurements from probe No. 1.

Figure 2:
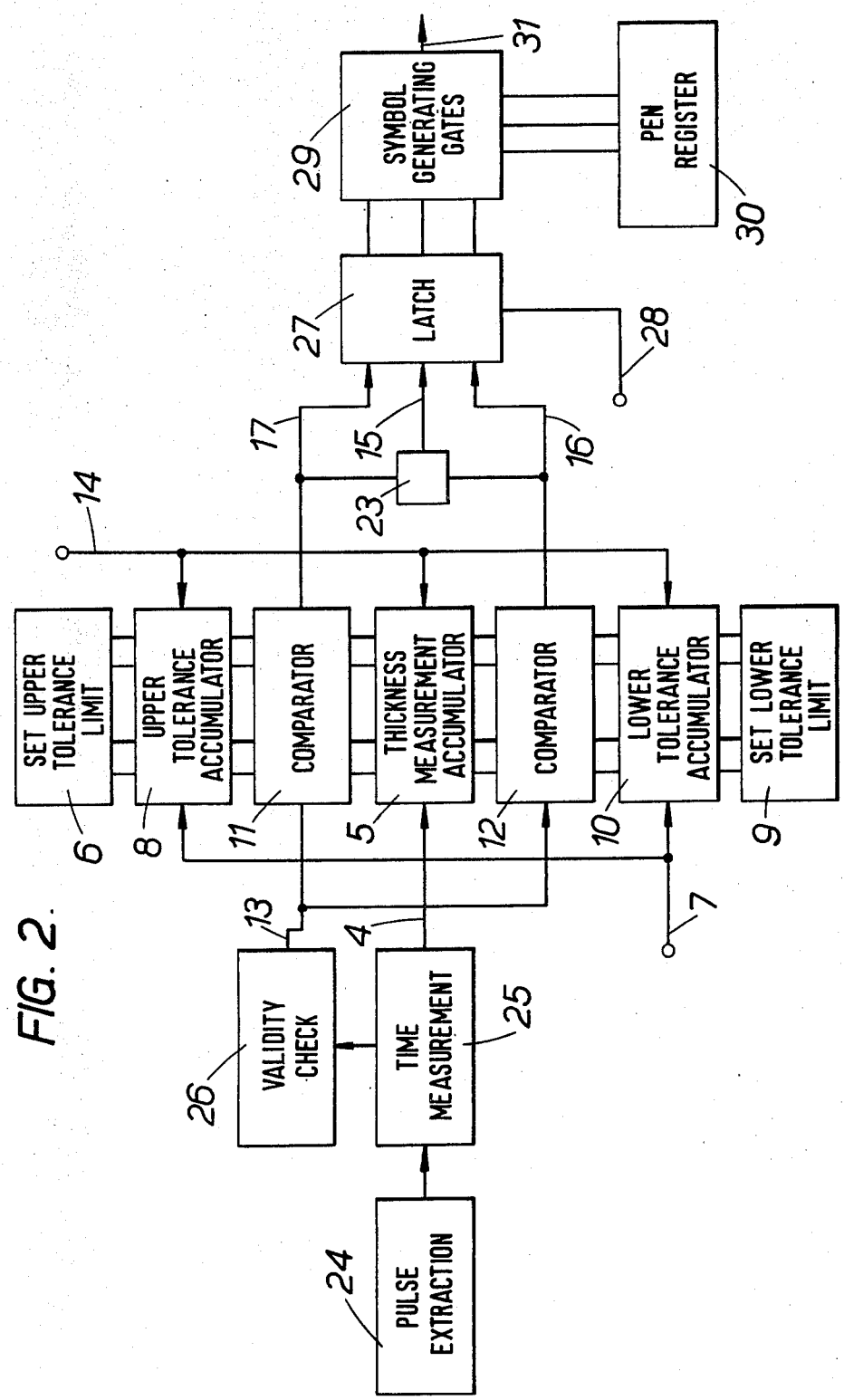
FIG. 2 is a block diagram of the circuit arrangement.

20 of the 200 pulses per revolution are used to divide the tube circumference into the 5% segments shown in FIG. 1. The 1 pulse per revolution is used to synchronise the electronic scan such that the recorder chart presentation of the system always starts at the same point on the tube circumference along the length of the tube. Thus having divided the circumference electronically into 5% segments, the operation is effectively identical for each segment as follows:

Referring to FIG. 2, a pulse extraction subcircuit 24 extracts from the rotary probe signals representative of the transmitted pulse from the probe together with successive echo pulses received by the probe separated by time intervals indicative of the tube thickness. The signals from sub-circuit 24 are fed to a time measurement sub-circuit 25 wherein signals representing the time intervals between predetermined specific echo pulses are produced, which are in turn fed to a measurement validity checking sub-circuit 26 in which they are compared for an expected relationship indicative of satisfactory receipt of the expected echoes. The output of the validity check sub-circuit 26 is connected to an input 13 of comparators 11 and 12. At the same time the time measurement sub-circuit 25 produces a signal representative of the tube wall thickness which is fed via an input 4 to a thickness measurement accumulator 5.

Hence the first thickness measurement attempted after the start of segment 1 can give rise to three situations:
a. a valid thickness measurement
b. a non-valid thickness measurement
c. no thickness measurement possibly due for example to the surface conditions of tube under test If the thickness measurement is valid, it is passed via input 4 to the thickness measurement accumulator 5 which stores the sum total of the valid thickness measurements made during the segment. Every time a valid measurement is made, the upper thickness limit, which is pre-set on a thumb-wheel switch device 6, is loaded via input 7 into upper tolerance accumulator 8 which therefore stores the total of the set upper thickness limit muliplied by the number of valid thickness measurements made during the segment. At the same time the lower thickness limit, pre-set on a thumb-wheel switch device 9, is loaded into lower tolerance accumulator 10, via input 7 which therefore stores the total of the set lower thickness limit muliplied by the number of valid thickness measurements made during the segment.

A command pulse is generated at the end of each segment if more than a predetermined number of valid thickness measurements have been made during the segment. This predetermined number is selectable on the equipment, and determines the minimum number of valid measurements necessary to obtain an average thickness assessment over the segment. If the number of valid measurements made over the segment exceeds the predetermined number of the total count, i.e. the sum total of the valid thickness measurements made during the segment and stored in the thickness measurement accumulator 5 is compared with the total counts in both the upper and lower tolerance accumulators 6 and 9 by comparators 11 and 12 respectively.

If the number of valid measurements made over the segments does not exceed this predetermined number, no command pulse is generated at the end of the segment and thus the total count in the thickness accumulator is not compared against the counts in the upper and lower tolerance accumulators, and no result is obtained on the average tube thickness assessment over that segment. This condition is termed "No Valid Result."

If the number of valid measurements obtained over a segment does exceed the predetermined number, the command pulse is initiated and fed via input 13 to comparators 11 and 12 and the comparison between the thickness measurement accumulator 5 and the other two accumulators 8 and 10 is made. Three conditions can arise:
a. The Lower Tolerance Accumulator count is less than the Thickness Measurement Accumulator count which is less than the Upper Tolerance Accumulator count. This condition is termed "Within Tolerance" and gives rise to an output at 15 via an AND gate 23
b. The Lower Tolerance Accumulator count is greater than the Thickness Measurement Accumulator count which is less than the Upper Tolerance Accumulator count. This condition is termed "Below Tolerance" and gives rise to an output at 16
c. The Lower Tolerance Accumulator count is less than the Thickness Measurement Accumulator count which is greater than the Upper Tolerance Accumulator count. This condition is termed "Above Tolerance" and gives rise to an output at 17

A fourth condition which has been previously described is also included as follows:
d. The number of valid thickness measurements made over segment does not exceed predetermined number. This condition is termed "No Valid Result"

Irrespective of whether the comparison command strobe pulse is generated or not, a pulse at the end of the segment is fed via input 14 to reset the accumulators 5, 8 and 10 a short period of time after the expected comparison command strobe pulse, and the system is now ready to accept information from the next segment.

The outputs of the comparators are fed to an electronic latch sub-circuit 27 which stores the information from the comparators after the accumulators are reset for the next segment assessment of thickness.

The operation of the latch sub-circuit 27 is controlled by a clock signal applied at input 28.

After being passed through the latch sub-circuit 27 the information from the comparators passes to symbol generating gates 29 which are controlled by a pen register sub-circuit 30. The output 31 from the gates 29 controls the operation of an electrostatic pen recorder of known kind (not shown).

Each condition given above, i.e. (a), (b) or (c) is attributed a symbol which is recordable on the electrostatic pen recorder by the pattern generator gates 29. The operation of the pattern generator on the record sheet is illustrated most clearly in FIG. 3. The pattern generator produces symbols by energising specific recorder pens on successive pen scans across the record sheet. The grid pattern chosen is 5 × 5, i.e. the pens are energised by the pattern generator for groups of five successive scans.

The symbols chosen for the three conditions mentioned above are illustrated in FIG. 4, and comprise a filled in 5 × 5 box 18 "Within Tolerance", a plus sign 19 for "Above Tolerance", and a minus sign 20 for "Below Tolerance."

The "No Valid Result" conditions will not result in a command to the pattern generator and thus no symbol will be printed, thus causing a blank space on the main matrix display.

Figure 3:
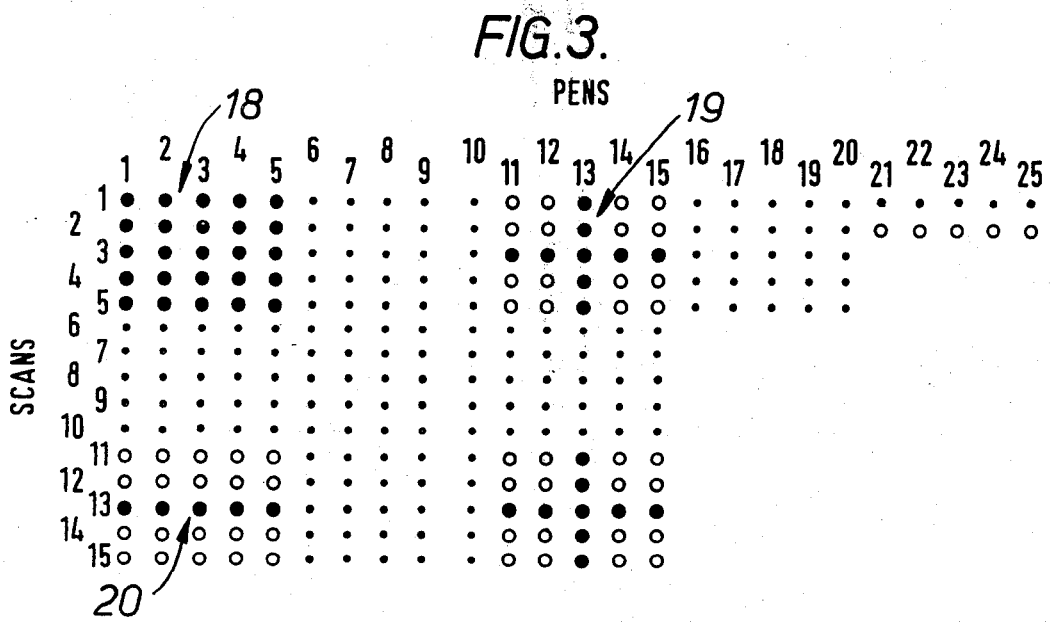
FIG. 3 shows the manner of formation of the record symbols indicative of the comparison results.

The symbols for conditions (a), (b) and (c) are printed in the examples shown in FIG. 3 as follows:

a. The Within Tolerance symbol 18 is printed by energising each of pens 1 to 5 on each of scans 1 to 5
b. The Above Tolerance symbol 19 is printed as follows:
   Energise pen 13 on scan 1
   Energise pen 13 on scan 2
   Energise pen 11 – 15 scan 3
   Energise pen 13 on scan 4
   Energise pen 13 on scan 5
c. The Below Tolerance symbol is printed as follows:
   Energise no pens on scan 11
   Energise no pens on scan 12
   Energise pens 1 – 5 on scan 13
   Energise no pens on scan 14
   Energise no pens on scan 15

200 pens of the electrostatic recorder are used for the display. As each segment is 5% of the tube circumference, there will be 20 symbols across the 200 pens, the width of which represents the tube circumference. Each symbol requires five pens across the width of the chart, therefore, during pen scanning to obtain adequate symbol spacing, an equal mark/space ratio is used, i.e. every alternate five pens (e.g. 6 to 10 and 16 to 20) are not used. On the length of the chart five scans are required to print out the symbol on a 5 x 5 agreed pattern. In order to ensure adequate mark space ratio in the longitudinal direction on the chart, on any one symbol, which is produced on five successive scans, the next successive five scans (e.g. 6 to 10) for that symbol are deliberately made blank.

As a result of the foregoing, and as shown in the sample record sheet of FIG. 4 a symbol is produced on every 5% segment except in the case of "No Valid Result" (in which case a blank is left as shown at 21), over the whole helical path length of the probe on the tube surface. The resulting pictorial representation is a development of the tube with twenty 5% segments across the width of the record which represents the tube circumference. The number of symbols in the longitudinal direction, which represents the tube length, is dependent on the inspection pitch, for example, 240 symbols at a 2 inches pitch on a 40 ft. tube.

Indicator lamps may be provided to monitor the operation of the system. Thus each condition already described, i.e. "Within Tolerance," "Below Tolerance," "Above Tolerance" and "No Valid Result" may have associated with it an indicator lamp which illuminates every time that condition arises. In addition to this, a lamp may be provided to indicate the "No Valid Result" condition on both successive segments and successive spirals, i.e. successive number of blanks either in the transverse or longitudinal direction on the matrix.

The total number of "No Valid Results," obtained over a complete tube test, may be counted and if exceeding a predetermined number (or percentage), selectable on the equipment, an indicator lamp may be illuminated. This counter can be reset and the lamp extinguished by the approach of the next tube into the test area.

Paint marking facilities may be provided via electronic delays to mark the longitudinal position on the tube surface of the following:
a. plus indications (i.e. Above Tolerance)
b. plus indications (i.e. Below Tolerance)
c. Combined successive "No Valid Result"
d. Total "No Valid Results" exceeded As will be seen by means of the invention we have provided an easily readable and understandable visual record of deviation of the thickness of articles from an optimum desired thickness.

We claim:

1. Apparatus for testing an article for deviation thereof from an optimum thickness range including a thickness measuring device mounted for scanning movement across the article; means for making a plurality of thickness measurements of the article during each scanning movement of the thickness measuring device; electrical means for accumulating the thickness measurements of successive groups of a predetermined theoretical number of measurements during each scan and comparing the sum of accumulated measurements so obtained with the sum of an equivalent accumulation of predetermined upper tolerance thickness values and with the sum of an equivalent accumulation of lower tolerance thickness values, and visual recording means for recording each group comparison with alternative symbols indicative of whether the accumulated thickness measurements for each group is within, greater than or less than the optimum thickness range.

2. Apparatus as claimed in claim 15 wherein the visual recording means includes a paper sheet on which the symbols are set out in matrix from.

3. Apparatus as claimed in claim 2 wherein the visual recording means includes a multi-pen electrostatic recorder and wherein the recorder is adapted to scan the sheet a plurality of times for each scan of the measuring device across the article to build up the symbols.

4. Apparatus as claimed in claim 1 wherein the measuring device comprises an ultrasonic testing device adapted to transmit a plurality of ultrasonic pulses into the article during each scan and receive a plurality of echoes thereof after time intervals indicative of the thickness of the article.

5. Apparatus as claimed in claim 1 for use in testing for deviations of wall thickness of tubes wherein the measuring device is mounted for rotary movement about the tubes undergoing testing.

6. Apparatus as claimed in claim 1 incorporating electrical means adapted to produce signals indicative of whether the comparison is valid, and wherein the visual recording means is adapted to indicate if the comparison is not valid.

7. Apparatus as claimed in claim 1 including validity check means for determining the validity of each thickness measurement made, and means for counting the number of valid measurements made out of the predetermined number of possible measurements comprising each group of measurements and initiating the electrical means for comparing if the number of valid measurements is above a predetermined value.

8. A method of testing an article for deviation of thickness thereof from an optimum thickness range including scanning the article by means of a thickness measuring device; making a plurality of thickness measurements of the article during each scan; accumulating successive groups of a predetermined theoretical number of measurements during each scan; comparing the sum of accumulated measurements so obtained with the sum of an equivalent accumulation of predetermined upper tolerance thickness values and with the sum of an equivalent accumulation of predetermined lower tolerance thickness values; and marking a visual record with different symbols indicative of whether the accumulated thickness measurement for each group is within, greater than, or less than the optimum thickness range.

9. A method as claimed in claim 8 wherein the visual record is made by setting out the symbols in matrix form on a paper sheet.

10. A method as claimed in claim 9 wherein the symbols representative of the averages for each group in one scan are set out side by side in a rank across the sheet, and each scan is provided with a separate rank along the sheet.

11. A method as claimed in claim 9 wherein the visual record on the sheet is made by a multi-pen electrostatic recorder and wherein the symbols are built up on the sheet by a plurality of scans of the recorder across the sheet, so that the recorder scans the sheet a plurality of times for each scan of the measuring device across the article.

12. A method as claimed in claim 8 wherein the thickness measurements are made by an ultrasonic testing device transmitting a plurality of ultrasonic pulses into the article during each scan and receiving a plurality of echoes thereof after time intervals indicative of the thickness of the article.

13. A method as claimed in claim 8 for testing for the deviations of wall thickness of a tube comprising rotating a thickness measuring device in the helical path about the tube undergoing testing.

14. A method as claimed in claim 13 wherein one complete revolution about the tube is counted as one scan of the measuring device.

15. A method as claimed in claim 8 including detecting the presence of an invalid comparison, and indicating on the visual record the presence of such an invalid comparison.

16. A method as claimed in claim 8 including the steps of determining the validity of each thickness measurement made, counting the number of valid measurements made out of the predetermined number of possible measurements comprising each group of measurements, and initiating the step of comparing the accumulated measurements if the number of valid measurements is above a predetermined value.

* * * * *